J. J. SCHRADE.
WATER PURIFIER FOR ICE MACHINES.
APPLICATION FILED JAN. 7, 1910. RENEWED NOV. 1, 1910.
983,169.
Patented Jan. 31, 1911.
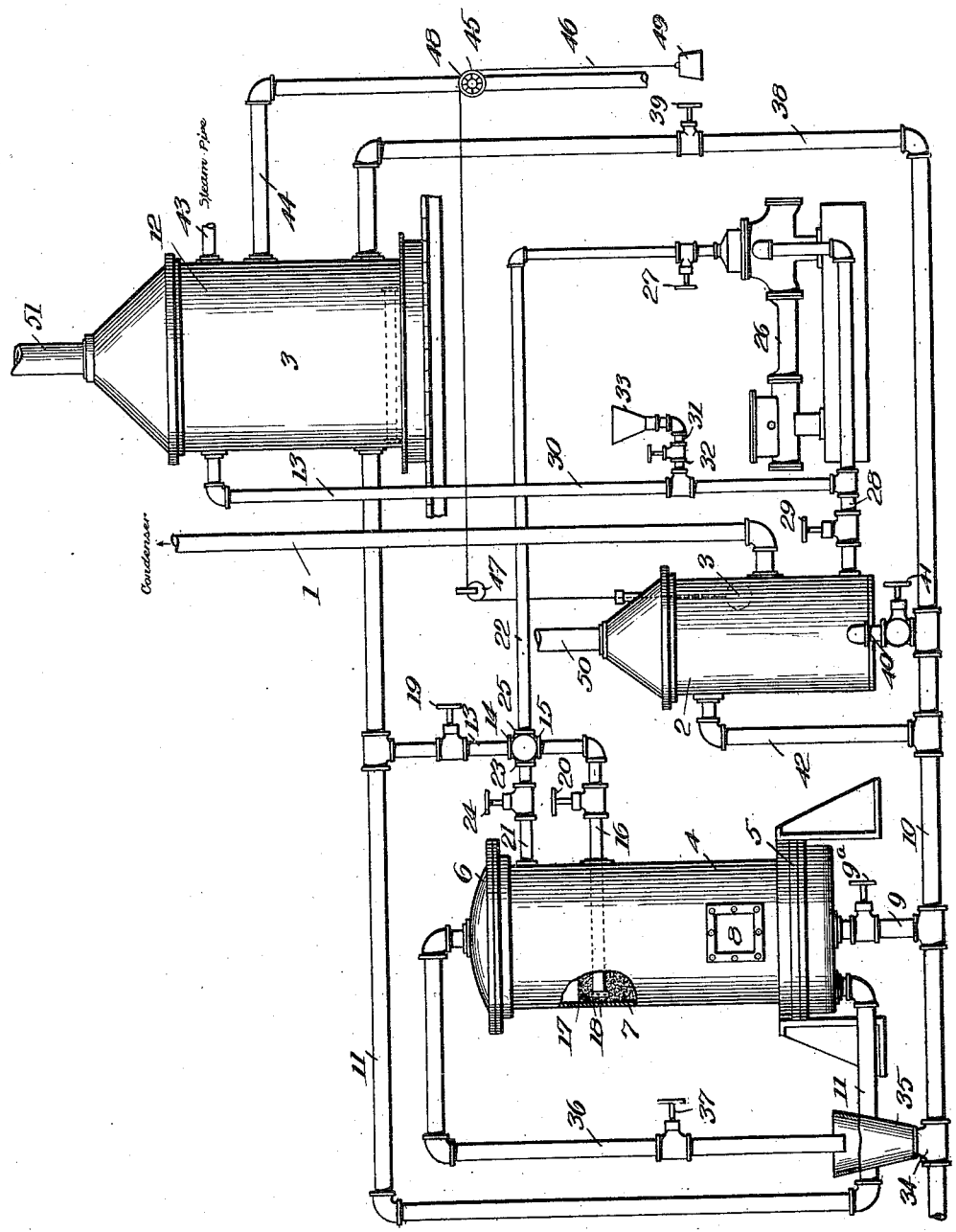
WITNESSES
INVENTOR
JOHN J. SCHRADE
BY
ATTORNEYS

UNITED STATES PATENT OFFICE.

JOHN JACOB SCHRADE, OF WACO, TEXAS.

WATER-PURIFIER FOR ICE-MACHINES.

983,169.      Specification of Letters Patent.     Patented Jan. 31, 1911.

Application filed January 7, 1910, Serial No. 536,795. Renewed November 1, 1910. Serial No. 590,157.

*To all whom it may concern:*

Be it known that I, JOHN J. SCHRADE, a citizen of the United States, and a resident of Waco, in the county of McLennan and State of Texas, have made certain new and useful Improvements in Water-Purifiers for Ice-Machines, of which the following is a specification.

My invention is an improvement in water purifiers for ice machines, and consists in certain novel constructions, and combinations of parts, hereinafter described and claimed.

The object of the invention is to provide a machine of the character specified especially adapted for the purification of water for artificial ice making, but adapted also for the purification of water for any purpose.

In the drawings is shown a diagrammatic view of the improvement.

The condensed water used in artificial ice making contains a certain amount of oil and other impurities, the principal part of the oil being derived from the necessary handling of the water during the process of condensing. The water comes from the condenser through the pipe 1 to the reservoir 2 by gravity, and the depth of the water is controlled by a float 3 shown in dotted lines.

A filter is arranged adjacent to the reservoir, the said filter comprising a casing 4 having a base 5, and a cover 6, and is filled about two thirds full of filtering material 7, preferably sand. The casing is provided with a man-hole 8, and with a discharge pipe 9 leading from its bottom to a waste pipe 10, the pipe 9 being normally closed by a valve 9ª.

A pipe 11 leads from the bottom of the filter to the reboiler 12, and a branch 13 leads from the said pipe to the upper branch 14 of a cross. The lower branch 15 of the cross is connected by a pipe 16 with the filter, the said pipe extending transversely across the filter just eighteen inches under the level of the filtering material, and being provided with a cap 17 having a plurality of discharge openings 18.

A valve 19 is interposed in the pipe 13, and a valve 20 is interposed in the pipe 16. A pipe 21 connects one lateral branch 23 of the cross with the upper end of the filter casing, and a valve 24 is interposed in the pipe, and the other lateral branch 25 of the cross is connected by a pipe 22 with a force pump 26, a valve 27 being interposed in the said pipe.

The pump 26 is of any preferred form, and is connected by a pipe 28 having a valve 29, with the lower end of the reservoir. A branch pipe 30 leads from the pipe 28 to the upper end of the reboiler, and a pipe 31 having a valve 32 extends laterally from the branch, and a funnel 33 is connected with the free end thereof, the said funnel being adapted to contain about one gallon of gasolene.

The waste pipe 10 has interposed in the length thereof a tee 34, and a funnel 35 is connected with the lateral branch of the tee. A pipe 36 having a valve 37, leads from the top of the filter casing and discharges into the funnel, and one end of the waste pipe is connected by a pipe 38 having a valve 39 with the lower end of the reboiler. The waste pipe 10 is also connected with the bottom of the reservoir 2 by a pipe 40 having a valve 41, and with the top of the reservoir by a pipe 42. The reboiler 3 is provided with a steam inlet pipe 43, and with a discharge pipe 44 leading to the cooling coils, and controlled by a valve 45, which is operated by the float 3 before mentioned in the reservoir.

A cord 46 connected with the float passes over a pulley 47, to and over a wheel 48 connected with the valve 45, and the lower end of the cord is provided with a weight 49. When the water in the reservoir reaches a predetermined height the movement of the cord rotates the wheel and opens the valve.

Both the reservoir and the reboiler are provided with vent pipes 50 and 51 respectively, in the reservoir to permit the escape of air when the reservoir fills, and for a similar purpose in the reboiler when the air is expanded by the heat.

In operation, the condensed water passes by gravity from the usual condensers to the reservoir. From the reservoir it is taken through the pipe 28 by the pump 26 and forced through the pipes 22 and 21 to the upper end of the filter casing, the valves 29—27 and 24 being open, and the valves 32—19 and 20 being closed. The water passes into the filter casing, and filters down through the filtering material, and is discharged through the pipe 11 to the lower end of the reboiler, the valve 9ª being meanwhile closed. In the reboiler it is reheated by steam entering through the pipe, and is discharged through the pipe 44, the valve 45 being open, into the usual cooling coils. The water is forced into the filter casing, and downward through the filtering material, and all impure material is deposited in the upper portion of the sand, that discharged through the bottom of the filter being absolutely pure as to solid matter and oil, and the gases are expelled in the reboiler. When it is desired to clean the filter, which should be done frequently, the valve 24 is closed and the valves 20 and 37 are opened. The water now passes from the pump through the pipes 22 and 16 and is discharged in a spray pipe 18, and passes through the upper filtering material, and the pipe 36 into the funnel 35, and thence into the waste pipe 10. By means of the interruption in the pipe 36, the state of the water discharged may be observed by the operator. By opening the valve 32, and permitting the gasolene in the funnel to run into the pipe 28, the gasolene is forced through to the filter, and dissolves and removes all the oil and other solid matter that is held in suspension on top of filtering material, removing it through the pipe 36. By means of the pipe 13, the water may be refiltered as often as desired, by the speed of pump, the reboiler will overflow into the reservoir 2, and will continue to pass through the filter. Each of the devices, the filter, the reboiler, and the reservoir may be emptied into the waste pipe, by opening the valves 9ª, 39 and 41, respectively.

It will be evident that there is but little waste of water in the above system, none in fact except when the filter is cleaned, while by the usual method, the water must be continually skimmed to remove the oil, and a large amount of water, that has already been condensed, is wasted.

The filter and reservoir may be located on the ground floor of any ice plant, and the reboiler at a higher point, with the fore coolers below, so that the condensed and filtered water passes from the reboiler to the fore coolers, and thence to the molds. The pipe 42 prevents the overflowing of the reservoir, and permits the excess water to discharge into the waste pipe. For changing the filtering material or making other repairs on same close valves 20 and 24 and open valve 19.

I claim—

1. The combination with the reservoir, and the reboiler arranged above the reservoir, of a filter on the level of the reservoir, a force pump, a pipe leading from the reservoir to the pump, a branch pipe leading from the top of the reboiler to the said pipe, a funnel communicating with said branch, a valve normally closing the communication, a valve in the first named pipe between the reservoir and the branch pipe, a pipe leading from the pump to the top of the filter, and having a branch extending into the filter at a lower level, and provided with a plurality of discharge openings, a valve in said pipe adjacent to the pump, a valve in the branch pipe, and a second valve in the pipe between the filter and the branch pipe, a pipe leading from the bottom of the filter to the lower part of the reboiler, a branch leading from said pipe to the pipe leading from the pump to the filter, a valve in said branch, a waste pipe, pipes leading from the bottom of the reboiler, the reservoir and the filter to the waste pipe, a valve in each of said pipes, a pipe leading from the top of the reservoir to the waste pipe, a funnel interposed in said waste pipe, and a pipe leading from the top of the filter and discharging into the funnel.

2. The combination with the reservoir and the reboiler, of a filter, a force pump, a connection between the pump and the reservoir, a discharge pipe leading from the pump to the top of the filter, a branch pipe from said discharge pipe opening into the filter at a lower level than the discharge, valves in said pipe and the branch pipe, a pipe leading from the lower part of the filter to the reboiler, a pipe leading from the top of the reboiler to the connection between the pump and the reservoir, a container for gasolene communicating with said pipe, a valve normally closing the communication, a waste pipe, a funnel interposed therein, and a discharge pipe leading from the top of the filter and discharging into the funnel.

3. The combination with the reboiler and the reservoir, of a filter, a force pump for passing the water from the reservoir to the filter, an overflow pipe leading from the top of the reboiler and communicating with the reservoir, a pipe leading from the filter to the reboiler, a waste pipe, a funnel interposed in said pipe, a pipe leading from the top of the filter and discharging into the funnel, a gasolene container communicating with the overflow pipe, a valve normally closing the communication, a pipe extending across the filter and having a plurality of discharge openings, and means for connecting said pipe with the pump.

4. The combination with the reboiler and the reservoir, of an overflow pipe leading from the top of the reboiler and communicating with the reservoir, a gasolene container interposed in said pipe, a valve normally disconnecting the container from the pipe, a filter, a force pump for withdrawing the water from the reservoir and passing it to the filter, a discharge pipe leading from the filter to the reboiler, a pipe extending across the filter and having a plurality of discharge openings, means for disconnecting the pump from the reservoir and connecting it with the gasolene container, and means for connecting said pump with the pipe extending across the filter.

5. The combination with the reservoir and the reboiler, of a filter, a pump normally drawing the water from the reservoir and passing it through the filter to the reboiler, a cleaning pipe extending across the filter, and having a plurality of discharge openings, a gasolene container, means for disconnecting the pump from the reservoir and the filter, means for connecting said pump with the gasolene container and the cleaning pipe, a discharge pipe leading from the top of the filter, and a funnel below the end of said pipe and into which the pipe discharges.

6. The combination with the reservoir and the reboiler, of a filter, a pump normally drawing the water from the reservoir and passing it through the filter to the reboiler, a cleaning pipe extending across the filter, a gasolene container, means for disconnecting the pump from the reservoir and the filter, means for connecting said pump with the gasolene container and the cleaning pipe, a discharge pipe leading from the top of the filter, and a funnel below the end of said pipe and into which the pipe discharges.

7. The combination with the reservoir and the reboiler, of a filter, a pump normally drawing the water from the reservoir and passing it through the filter to the reboiler, a cleaning pipe extending across the filter, a gasolene container, means for disconnecting the pump from the reservoir and the filter, and means for connecting said pump with the gasolene container and the cleaning pipe.

8. The combination with the reservoir and the reboiler, of a filter, means for withdrawing water from the reservoir and passing it through the filter to the reboiler, an overflow pipe leading from the reboiler and delivering into the reservoir, a gasolene container in connection with said overflow pipe, a valve in the connection, a cleaning pipe in the filter, and means for connecting said water withdrawing means with the overflow pipe and the cleaning pipe for the purpose specified.

9. The combination with the reservoir and the reboiler, of means for withdrawing liquid from the reservoir and passing it to the reboiler, a filter interposed in said means, a container for a cleaning fluid, means for disconnecting said withdrawing means from the reservoir and connecting it with the container for the purpose specified, a discharge pipe leading from the top of the filter, and a funnel into which said pipe delivers.

10. The combination with the reservoir and the reboiler, of means for withdrawing liquid from the reservoir and passing it to the reboiler, a filter interposed in said means, a container for a cleaning fluid, and means for disconnecting said withdrawing means from the reservoir and connecting it with the container for the purpose specified.

11. The combination with the reservoir and the reboiler, of a filter, means for withdrawing water from the reservoir and passing it through the filter to the reboiler, and an overflow pipe leading from the reboiler and delivering into the reservoir.

12. In combination, a reservoir, a reboiler, a filter, and a force pump, means for permitting said pump to withdraw water from the reservoir and pass it through the filter to the reboiler, a cleaning pipe in the filter, a container for a cleaning fluid, means for passing the fluid from the container to the cleaning pipe, and means for diconnecting the pump from said first named means and connecting with the last named means.

13. In combination, a reservoir, a reboiler, and a filter, a pump, means for permitting said pump to withdraw liquid from the reservoir and pass it through the filter to the reboiler, a receptacle for a cleaning fluid, means for connecting said receptacle with the pump, a waste pipe having a funnel, and a discharge pipe leading from the top of the filter and discharging into the funnel.

14. In combination, a reservoir, a reboiler, and a filter, a pump, means for permitting said pump to withdraw liquid from the reservoir and pass it through the filter to the reboiler, a receptacle for a cleaning fluid, means for connecting said receptacle with the pump, and a discharge pipe leading from the top of the filter.

15. In combination, a reservoir, a reboiler, and a filter, a pump, means for permitting said pump to withdraw liquid from the reservoir and pass it through the filter to the reboiler, a receptacle for a cleaning fluid, and means for connecting said receptacle with the pump.

16. In an apparatus of the character specified, a filter, means for supplying water to the top of the filter, a cleaning pipe extending across the filter intermediate its ends, a container for a cleaning fluid, a pump normally drawing water from a reservoir and delivering it to the filter, and means for connecting the pump with the container and the cleaning pipe for the purpose specified.

JOHN JACOB SCHRADE.

Witnesses:
LESLIE S. WYNNE,
E. B. BAKER.